(12) United States Patent  
Pavani

(10) Patent No.: US 11,583,162 B2  
(45) Date of Patent: Feb. 21, 2023

(54) TARGETED DISH CLEANER

(71) Applicant: Sri Rama Prasanna Pavani, San Carlos, CA (US)

(72) Inventor: Sri Rama Prasanna Pavani, San Carlos, CA (US)

(73) Assignee: Dishcare Inc., San Carlos, CA (US)

(*) Notice: Subject to any disclaimer, the term of this patent is extended or adjusted under 35 U.S.C. 154(b) by 78 days.

(21) Appl. No.: 17/156,524

(22) Filed: Jan. 23, 2021

(65) Prior Publication Data

US 2022/0233050 A1 Jul. 28, 2022

(51) Int. Cl.
| | |
|---|---|
| *A47L 15/00* | (2006.01) |
| *A47L 15/22* | (2006.01) |
| *A47L 15/42* | (2006.01) |
| *F21V 33/00* | (2006.01) |
| *G03B 17/00* | (2021.01) |
| *G03B 35/08* | (2021.01) |
| *G06V 10/20* | (2022.01) |
| *G06V 20/68* | (2022.01) |

(52) U.S. Cl.
CPC ........... *A47L 15/22* (2013.01); *A47L 15/0028* (2013.01); *A47L 15/0036* (2013.01); *A47L 15/4278* (2013.01); *A47L 15/4282* (2013.01); *A47L 15/4295* (2013.01); *F21V 33/0044* (2013.01); *G03B 17/00* (2013.01); *G03B 35/08* (2013.01); *G06V 10/255* (2022.01); *G06V 20/68* (2022.01); *A47L 2401/04* (2013.01); *A47L 2401/30* (2013.01); *A47L 2501/20* (2013.01); *Y02B 40/00* (2013.01)

(58) Field of Classification Search
None
See application file for complete search history.

(56) References Cited

U.S. PATENT DOCUMENTS

| 8,905,053 B2 | 12/2014 | Thiyagarajan | |
|---|---|---|---|
| 2012/0138092 A1* | 6/2012 | Ashrafzadeh | A47L 15/4295 |
| | | | 134/57 D |
| 2020/0390312 A1 | 12/2020 | Welch | |

FOREIGN PATENT DOCUMENTS

KR 100657806 B1 4/2006

\* cited by examiner

*Primary Examiner* — Levon J Shahinian

(57) ABSTRACT

A system and method for cleaning a dish, comprising: illuminating said dish with a light source; capturing an image of said dish with a camera; inspecting said image to determine if said dish is clean; and estimating locations of dirty regions on said dish; spraying a fluid with a first nozzle on said dish with a predetermined spray distribution, wherein said first nozzle can reorient or relocate to spray said fluid on any region of said dish visible in said image; and spraying a fluid with a second nozzle on said dish with a spray distribution having a smaller coverage than that of said first nozzle, wherein said second nozzle is relocated or reoriented such that the fluid reaches said dirty regions at said locations on said dish; whereby dirty regions of said dish are targeted for a fast and efficient cleaning of said dish.

20 Claims, 15 Drawing Sheets

TARGETED DISH CLEANER

FIELD OF THE INVENTION

This invention relates generally to cleaning a reusable dish.

BACKGROUND

Conventional dishwashers are designed for washing a large number of dishes at once. Such batch washing comes with two major problems. Firstly, when washing a large number of dishes together, conventional dishwashers prioritize the average cleanliness of a group of dishes over the thorough cleanliness of every individual dish. Conventional dishwashers typically employ a turbidity detector to measure the quantity of dirt present in water during the cleaning process. When the turbidity detector senses the dirt level to be under a threshold, conventional dishwashers assume that dishes are clean. Such an assumption arrived based on the average state of a batch of dishes often overlooks the state of each individual dish in the batch. Conventional dishwashers do not have the means to ensure every dish is thoroughly cleaned during the cleaning process. This is the reason why dishes often do not come out clean even after hours of washing in a conventional dishwasher. A slew of preparatory work such as scraping, rinsing, soaking, optimal loading and positioning of dishes according to their shape, size, and material becomes necessary to maximize the chances of dirty dishes coming out clean in a conventional dishwasher, albeit without any guarantee of success.

Secondly, typical dishwashers found in homes are substantially slower than washing dishes by hand in a kitchen sink; and consume much more water and energy. This is because batch dishwashing lacks the perception and ability to focus on dirty regions of an individual dish. As a result, it spends much more resources on clean regions of dishes than what is necessary, in an attempt to maximize the chances of all dirty regions of dishes to come out clean. Batch dishwashing fundamentally suffers from a tradeoff between the duration of the dishwashing cycle and cleanliness of each dish. Without the perception to evaluate the cleanliness of each dish, batch dishwashing resorts to longer dishwashing cycles, spanning hours, to increase the chances of removing dirt from all dishes, thereby causing a significant wastage of time, energy, and water.

Accordingly, there is a need for an improved system and method to clean a dirty dish thoroughly, efficiently, and painlessly. One that could clean each dish with individual attention to ensure every dish comes out clean after cleaning; one that could conserve energy and water; and one that could be as fast as hand washing of dishes.

SUMMARY

The invention is a system and method for cleaning a dish. In some embodiments, the invention is a system for cleaning a dish, comprising: a light source for illuminating said dish; a camera for capturing an image of said dish; a processor to inspect said image to determine if said dish is clean; and to estimate locations of dirty regions on said dish; a first nozzle for spraying a fluid on said dish with a predetermined spray distribution, wherein said first nozzle can reorient or relocate to spray said fluid on any region of said dish visible in said image; and a second nozzle for spraying a fluid on said dish with a spray distribution having a smaller coverage than that of said first nozzle, wherein said second nozzle is relocated or reoriented such that the fluid reaches said locations of dirty regions on said dish, whereby dirty regions of said dish are targeted for a fast and efficient cleaning of said dish.

In some embodiments, the invention is a method for cleaning a dish, comprising: illuminating said dish with a light source; capturing an image of said dish with a camera; inspecting said image to determine if said dish is clean; and estimating locations of dirty regions on said dish; spraying a fluid with a first nozzle on said dish with a predetermined spray distribution, wherein said first nozzle can reorient or relocate to spray said fluid on any region of said dish visible in said image; and spraying a fluid with a second nozzle on said dish with a spray distribution having a smaller coverage than that of said first nozzle, wherein said second nozzle is relocated or reoriented such that the fluid reaches said dirty regions at said locations on said dish; whereby dirty regions of said dish are targeted for a fast and efficient cleaning of said dish.

DETAILED DESCRIPTION OF THE PREFERRED EMBODIMENTS

Figure 1:
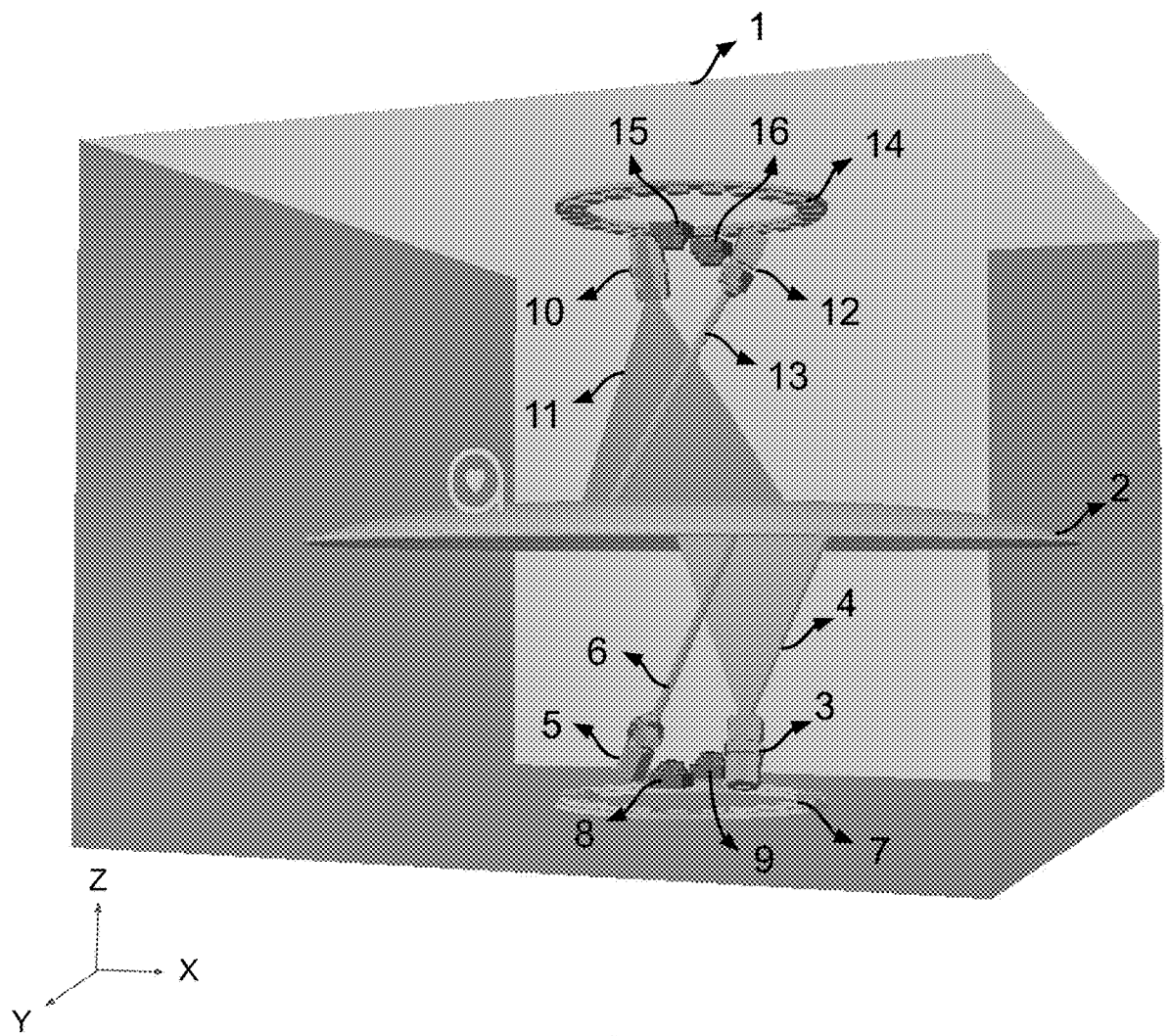
FIG. 1 shows a three-dimensional view of a targeted dish cleaner designed to clean two opposite sides of a dish simultaneously, in accordance with the invention.

FIG. 1. shows a three-dimensional view of a targeted dish cleaner 1 designed to clean a dish 2, in accordance with the invention. In the targeted dish cleaner 1, dirty regions of dish 2 are targeted for a fast and efficient cleaning of dish 2.

In some embodiments, light source 7 illuminates dish 2, while cameras 8 and 9 capture one or more images of dish 2. A dish is an article that makes contact with a food or a drink while preparing, serving, consuming, or storing of the food or the drink. One or more images from cameras 8 and 9 are inspected by a processor to determine if dish 2 is clean. The processor also estimates locations of dirty regions on dish 2. In some embodiments, locations of dirty regions are estimated using at least two images representing at least two different views of the dish. For example, by measuring the disparities of objects that are visible in multiple views and converting the disparity measurements to depth using stereo or multiple aperture calibration procedures. In other embodiments, locations of dirty regions are estimated using at least one image and a three dimensional model of the dish.

A first nozzle 3 sprays a fluid on dish 2 with a predetermined spray distribution 4. Fluids include liquids and gases such as water, soap, rinsing agent, sanitizing agent, cleaning agent, or air. The first nozzle 3 can reorient or relocate to spray fluid on any region of dish 2 visible in the one or more images captured by cameras 8 and 9. A second nozzle 5 sprays a fluid on dish 2 with a spray distribution 6 having a smaller coverage than that of the first nozzle 3. Coverage refers to the cross sectional area of the spray distribution on the surface of a dish. The second nozzle 5 is relocated or reoriented such that the fluid sprayed by it reaches the locations of dirty regions on dish 2, previously estimated by the processor.

Some embodiments have another set of light source 14, cameras 15 and 16, processor, first nozzle 10 and second nozzle 12 to clean two opposite sides of a dish simultaneously. In some embodiments, dish 2 is oriented to avoid holding of fluid. For example, in some embodiments, dish 2 is oriented such that the fluid sprayed by the nozzles leaves the surface of dish 2 due to gravity. In other embodiments, dish 2 is oriented to promote holding of fluid. For example, in some embodiments, dish 2 is oriented such that the fluid sprayed by the nozzles stays on the surface of dish 2 due to gravity or surface tension.

In some embodiments, a single camera is used. In other embodiments, more than one camera is used. Using multiple cameras helps with tolerating objects such as nozzles that might be occluding dish 2. For example, a region of dish 2 may not be visible in one camera view but might be visible in another camera view.

In some embodiments, the fluid sprayed by the nozzles is at a temperature hotter than the temperature of the dish. In other embodiments, the fluid sprayed by the nozzles is at a temperature colder than the temperature of the dish. In other embodiments, the fluid sprayed by the nozzles is at the temperature as the temperature of dish 2.

In some embodiments, the second nozzle 5 sprays fluid at a higher velocity than the first nozzle 3. Similarly, in embodiments designed for simultaneous cleaning of two sides of dish 2, the second nozzle 12 sprays fluid at a higher velocity than first nozzle 10. In some embodiments, the second nozzle 5 sprays fluid at a velocity similar to that of first nozzle 3. Similarly, in embodiments designed for simultaneous cleaning of two sides of dish 2, the second nozzle 12 sprays fluid at a velocity similar to that of first nozzle 10. In some embodiments, the second nozzle 5 sprays fluid at a lower velocity than the first nozzle 3. Similarly, in embodiments designed for simultaneous cleaning of two sides of dish 2, the second nozzle 12 sprays fluid at a lower velocity than first nozzle 10.

In some embodiments, the first nozzle 3 sprays fluid with a flat spray, conical, hollow cone, or a solid stream spray distribution. Similarly, in embodiments designed for simultaneous cleaning of two sides of dish 2, the first nozzle 10 sprays fluid with a flat spray, conical, hollow cone, or a solid stream distribution. In some embodiments, the second nozzle 12 sprays fluid with a solid stream distribution or a flat spray distribution. Similarly, in embodiments designed for simultaneous cleaning of two sides of dish 2, second nozzle 12 sprays fluid with a solid stream distribution or a flat spray distribution.

A nozzle has three axes of rotation, namely yaw, pitch, and roll. The roll axis typically corresponds to the axis lining up with the longest dimension of a nozzle, which is typically along a line connecting the entry and exit openings (orifices/ports) of a nozzle. The pitch and yaw axis are orthogonal to each other and are orthogonal to the roll axes.

In some embodiments, a nozzle having a flat spray distribution sprays fluid with spray angles having a continuous range from 0 degrees to an angle that is substantially greater than 0 degrees about the yaw axis; and a spray angle substantially equal to 0 degrees about the pitch axis. In other embodiments, a nozzle having a flat spray distribution sprays fluid with spray angles having a continuous range from 0 degrees to an angle that is substantially greater than 0 degrees about the pitch axis; and a spray angle substantially equal to 0 degrees about the yaw axis. In some embodiments, a nozzle having a solid stream spray distribution sprays fluid with a spray angle substantially equal to 0 degrees about both yaw and pitch axes. In some embodiments, a nozzle having a conical spray distribution sprays fluid with a spray angle having a continuous range from 0 degrees to a spray angle that is substantially greater than 0 degrees about both yaw and pitch axes. In some embodiments, a nozzle having a hollow cone spray distribution sprays fluid with spray angles having a continuous range from a first spray angle, which is substantially greater than 0 degrees, to a second spray angle, which is substantially greater than the first spray angle, about both yaw and pitch axes.

In some embodiments, first nozzle 3 and second nozzle 5 are part of a single adjustable nozzle, wherein the adjustable nozzle can be configured to change the shape of its spray distribution. For example, the shape of the spray distribution can be adjusted by mechanically altering the shape of the orifice through which fluid emerges from the nozzle.

In some embodiments, a nozzle is reoriented by attaching it to a mount that can rotate about the yaw, pitch, and roll axes. In other embodiments, a nozzle is reoriented by attaching it to a mount that can rotate about the yaw and pitch axes. In other embodiments, a nozzle is reoriented by attaching it to a mount that can rotate about the yaw axis. In other embodiments, a nozzle is reoriented by attaching it to a mount that can rotate about the pitch axis. In other embodiments, a nozzle is reoriented by attaching it to a mount that can rotate about the roll axis.

In some embodiments, a nozzle is relocated by attaching it to a mount that can translate about X, Y, and Z axes of the cartesian coordinate system. In other embodiments, a nozzle is relocated by attaching it to a mount that can translate about the X and Y axes. In other embodiments, a nozzle is relocated by attaching it to a mount that can translate about the X axis. In other embodiments, a nozzle is relocated by attaching it to a mount that can translate about the Y axis. In other embodiments, a nozzle is relocated by attaching it to a mount that can translate about the Z axis.

In some embodiments, light source 7 is arranged in a ring configuration surrounding cameras 8 and 9 to avoid specular reflection from being visible in images captured by the cameras. Similarly, in embodiments designed for simultaneous cleaning of two sides of dish 2, light source 14 is arranged in a ring configuration surrounding cameras 15 and 16 to avoid specular reflection from being visible in the image. Specular reflection refers to a bright image or a glare of light source visible in a camera image due to a reflection of light source by the surface of dish 2.

In some embodiments, first nozzle 3 and second nozzle 5 can rotate about their yaw, pitch, or roll axes. In other embodiments, first nozzle 3 and second nozzle 5 can rotate about their yaw and pitch axes. In other embodiments, first nozzle 3 can rotate about its yaw axis. In other embodiments, first nozzle 3 can rotate about its pitch axis. Similarly, in embodiments designed for simultaneous cleaning of two sides of dish 2, first nozzle 10 and second nozzle 12 can rotate about their yaw, pitch, or roll axes. In other embodiments, first nozzle 10 and second nozzle 12 can rotate about their yaw and pitch axes. In other embodiments, first nozzle 10 can rotate about its yaw axis. In other embodiments, first nozzle 10 can rotate about its pitch axis.

In some embodiments, the targeted dish cleaner 1 comprises a heating element for drying dish 2. Drying could be used to remove fluid from the surface of dish 2. For example, the heating element may generate heat by passing electricity flow through a high resistance coil. In some embodiments, the heating element is in contact with dish 2. Placing a heating element in contact with dish 2 could reduce the time required for dish 2 to dry. In some embodiments, the targeted dish cleaner 1 comprises an enclosure surrounding dish 2, wherein the enclosure is made from a material having higher thermal conductivity than that of dish 2. When the temperature of the enclosure is cooler than that of the dish, fluid from the surface of dish 2 could condense on the surface of the enclosure, thereby facilitating drying of dish 2.

In some embodiments, the targeted dish cleaner 1 comprises a directional flow control valve connected to a plurality of fluids to allow the first nozzle 3 or the second nozzle 5 to spray different types of fluids. Similarly, in embodiments designed for simultaneous cleaning of two sides of dish 2, the targeted dish cleaner 1 also comprises a directional flow control valve connected to a plurality of fluids to allow the first nozzle 10 or the second nozzle 12 to spray different types of fluids. Accordingly, a nozzle could spray one type of fluid at one time and another type of fluid at another time. In some embodiments, a mixture of two or more fluids may also be sprayed by a nozzle. In some embodiments, the targeted dish cleaner 1 comprises a flow control valve to adjust the pressure or flow of fluid entering into the first nozzle 3 or the second nozzle 5. Similarly, in embodiments designed for simultaneous cleaning of two sides of dish 2, the targeted dish cleaner 1 comprises a flow control valve to adjust the pressure or flow of fluid entering into the first nozzle 10 or the second nozzle 12.

In some embodiments, light source 7 emits ultraviolet light to disinfect the dish. Similarly, in embodiments designed for simultaneous cleaning of two sides of dish 2, light source 14 emits ultraviolet light to disinfect the dish. Ultraviolet light could include ultraviolet C radiation for sterilizing a dish.

Figure 2:
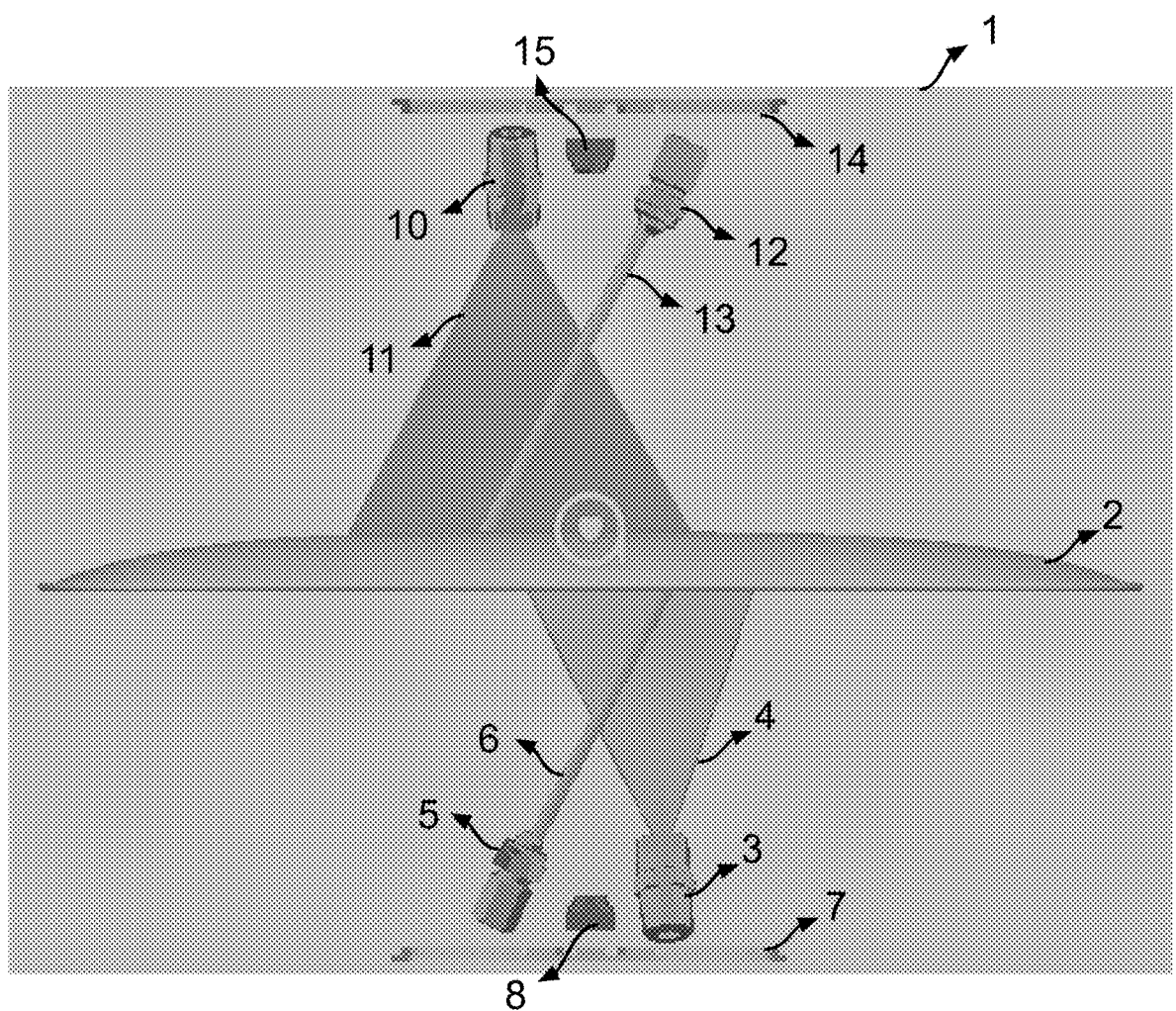
FIG. 2. shows a front view of a targeted dish cleaner designed to clean two opposite sides of a dish simultaneously, in accordance with the invention.

FIG. 2. shows a front view of a targeted dish cleaner 1 designed to clean two opposite sides of a dish simultaneously, in accordance with the invention.

Figure 3:
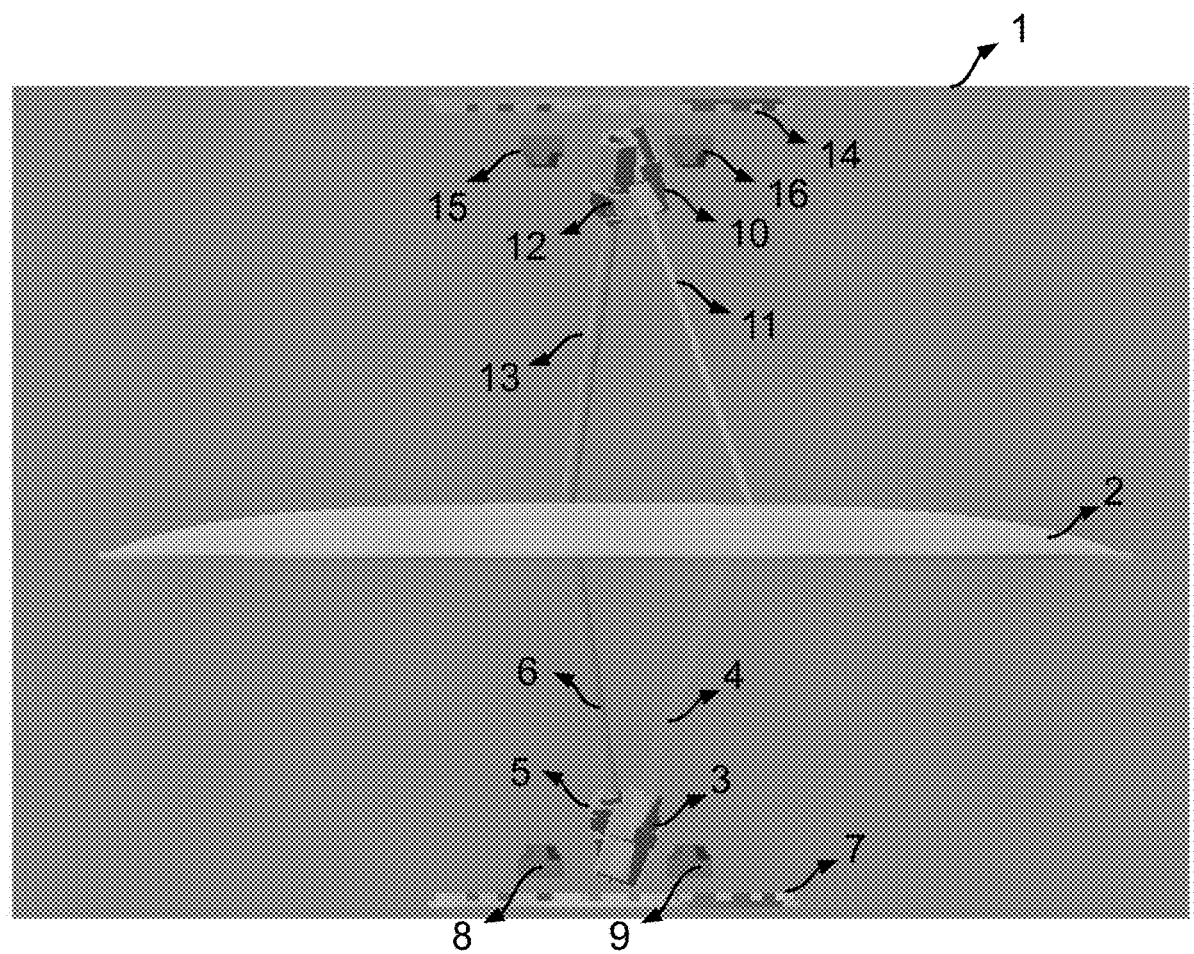
FIG. 3. shows a right-side view of a targeted dish cleaner designed to clean two opposite sides of a dish simultaneously, in accordance with the invention.

FIG. 3. shows a right-side view of a targeted dish cleaner 1 designed to clean two opposite sides of a dish simultaneously, in accordance with the invention.

Figure 4:
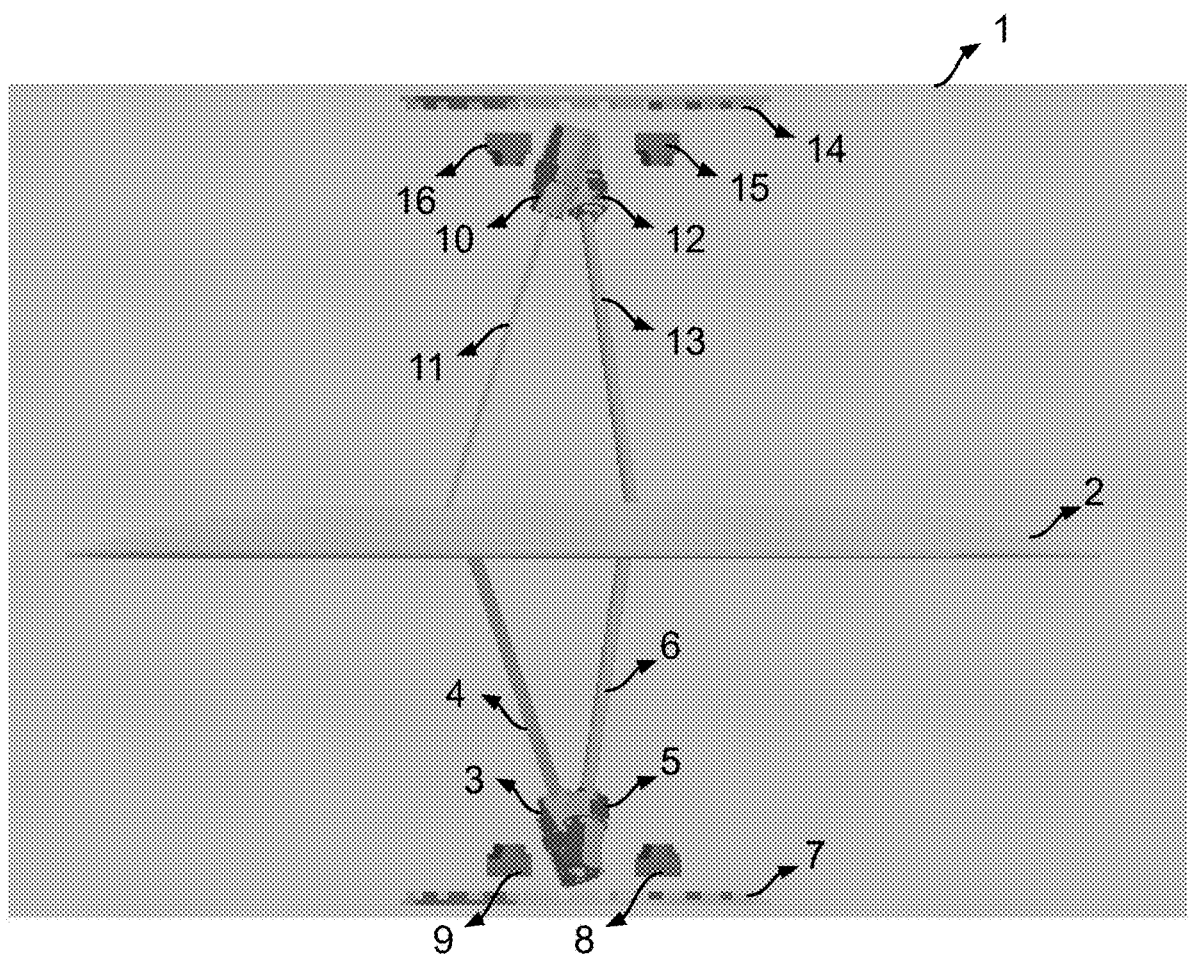
FIG. 4. shows a left-side view of a targeted dish cleaner designed to clean two opposite sides of a dish simultaneously, in accordance with the invention.

FIG. 4. shows a left-side view of a targeted dish cleaner 1 designed to clean two opposite sides of a dish simultaneously, in accordance with the invention.

Figure 5:
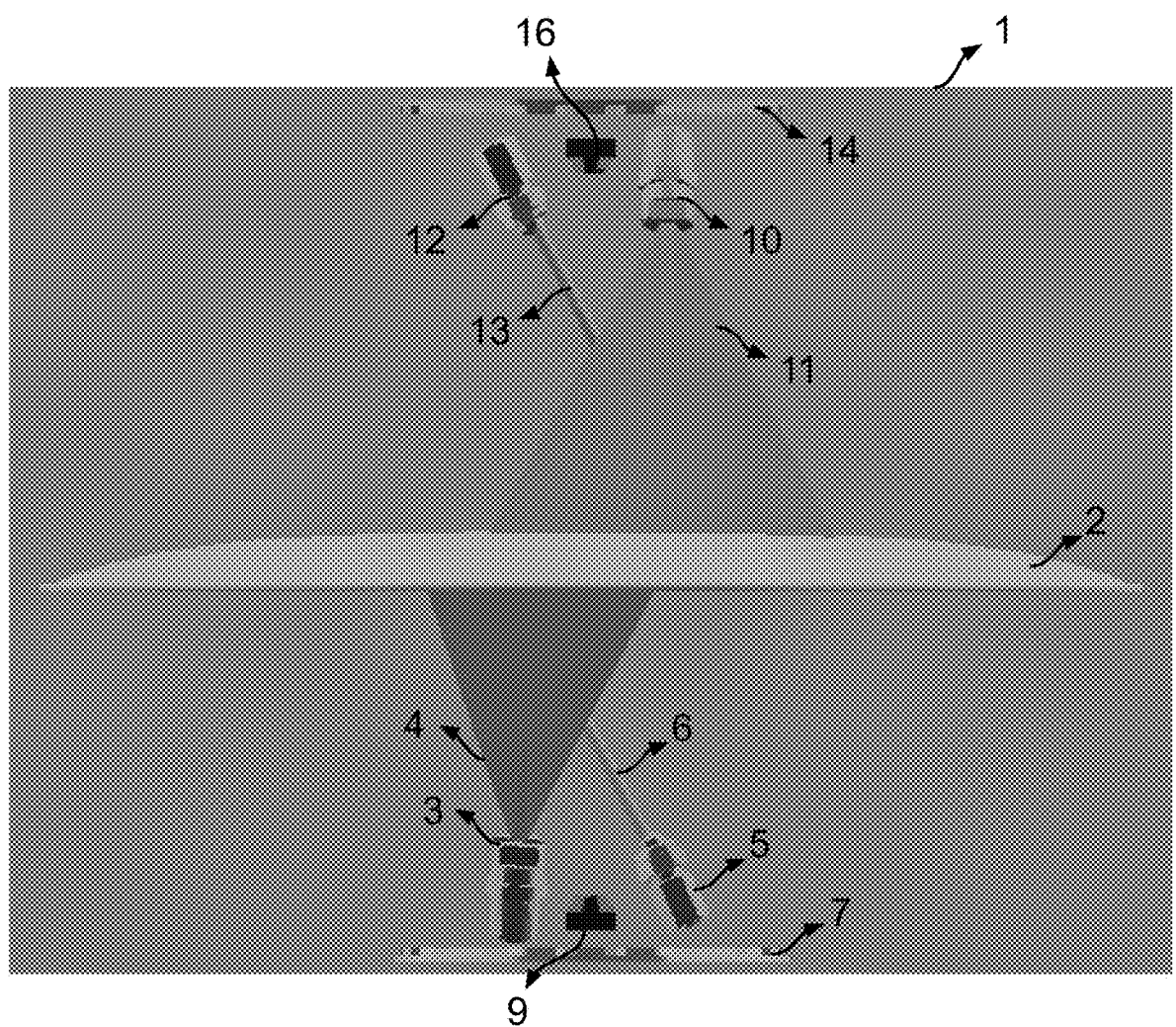
FIG. 5. shows a back view of a targeted dish cleaner designed to clean two opposite sides of a dish simultaneously, in accordance with the invention.

FIG. 5. shows a back view of a targeted dish cleaner 1 designed to clean two opposite sides of a dish simultaneously, in accordance with the invention.

Figure 6:
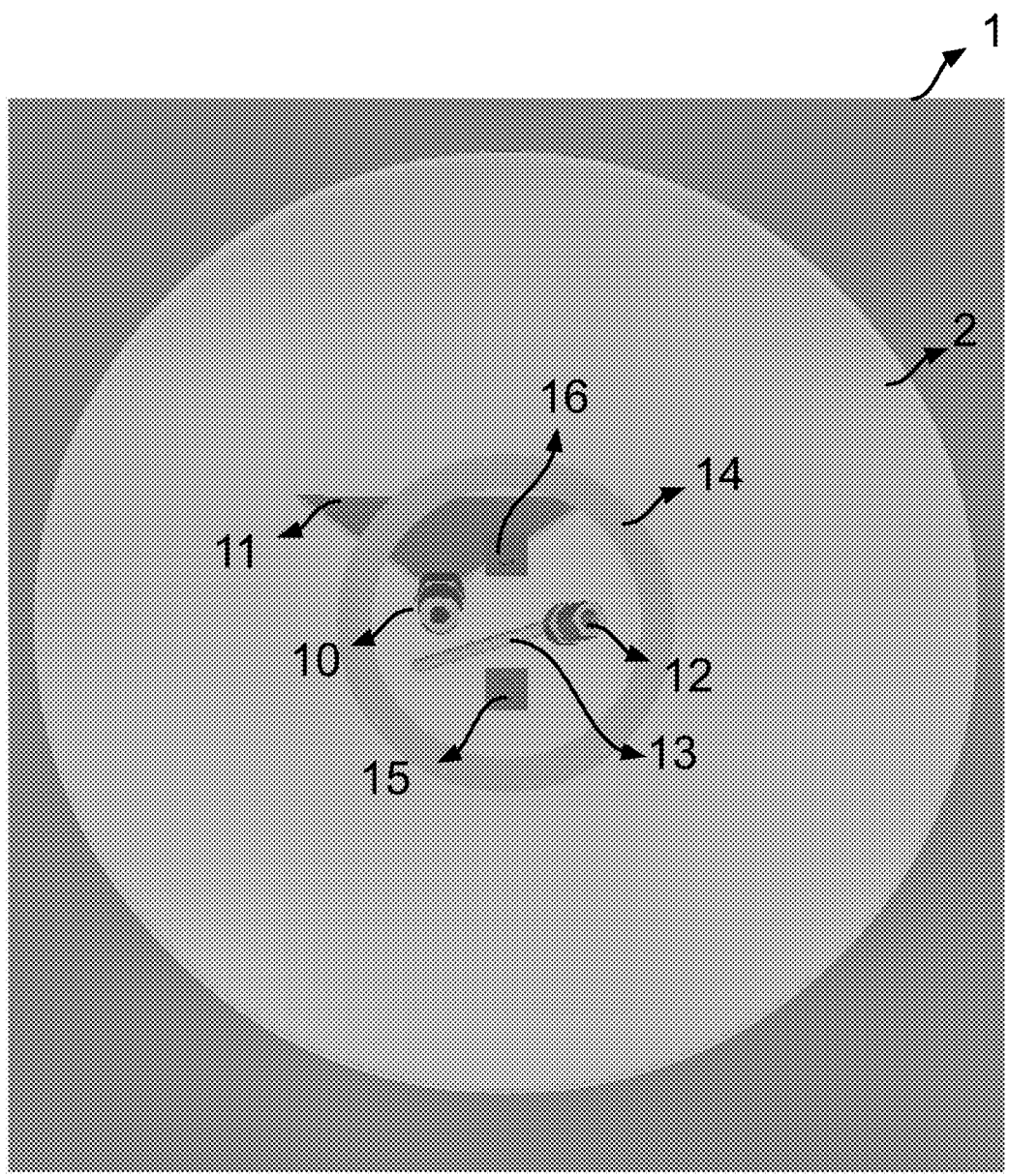
FIG. 6. shows a top view of a targeted dish cleaner designed to clean two opposite sides of a dish simultaneously, in accordance with the invention.

FIG. 6. shows a top view of a targeted dish cleaner 1 designed to clean two opposite sides of a dish simultaneously, in accordance with the invention.

Figure 7:
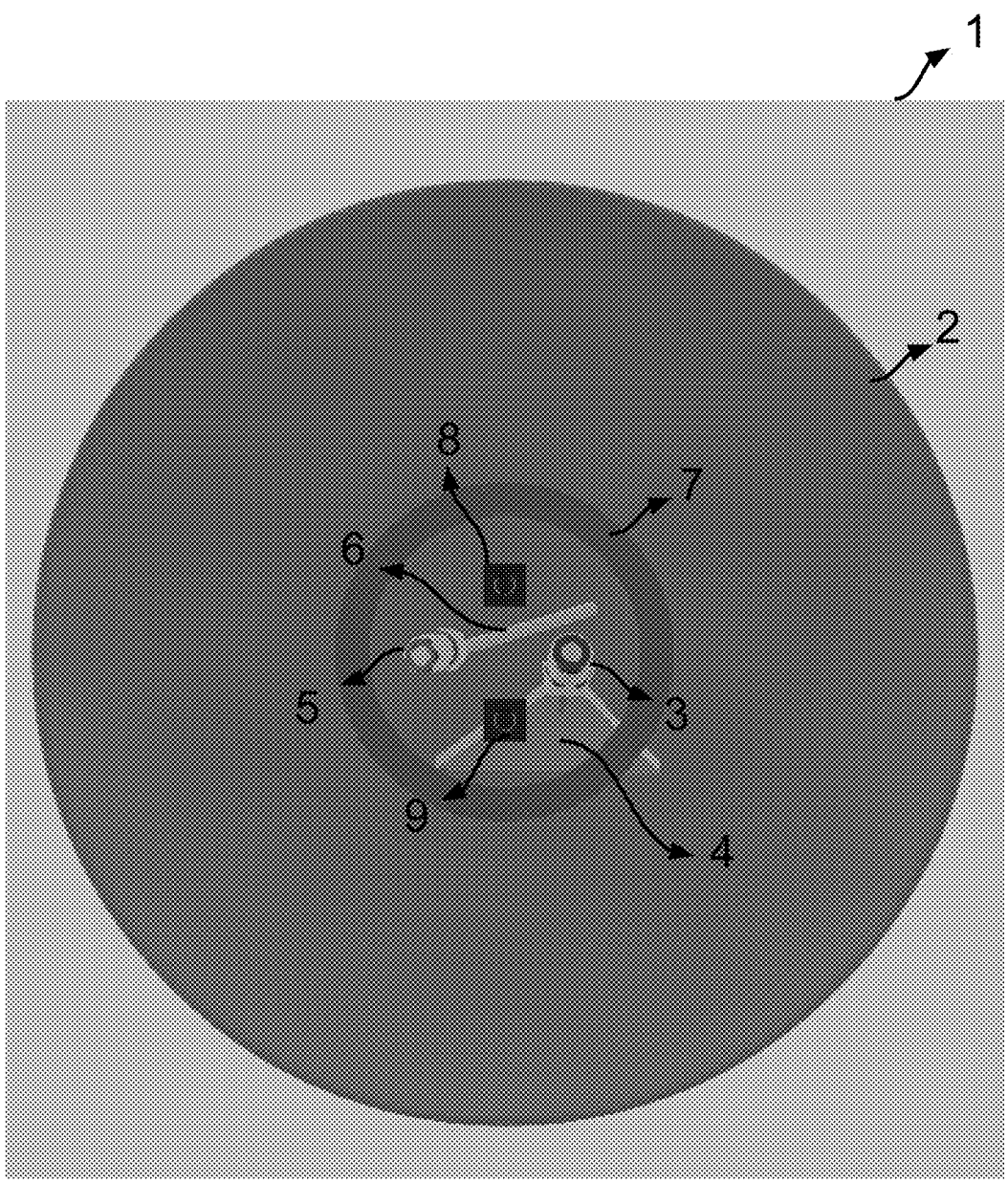
FIG. 7. shows a bottom view of a targeted dish cleaner designed to clean two opposite sides of a dish simultaneously, in accordance with the invention.

FIG. 7. shows a bottom view of a targeted dish cleaner 1 designed to clean two opposite sides of a dish simultaneously, in accordance with the invention.

Figure 8:
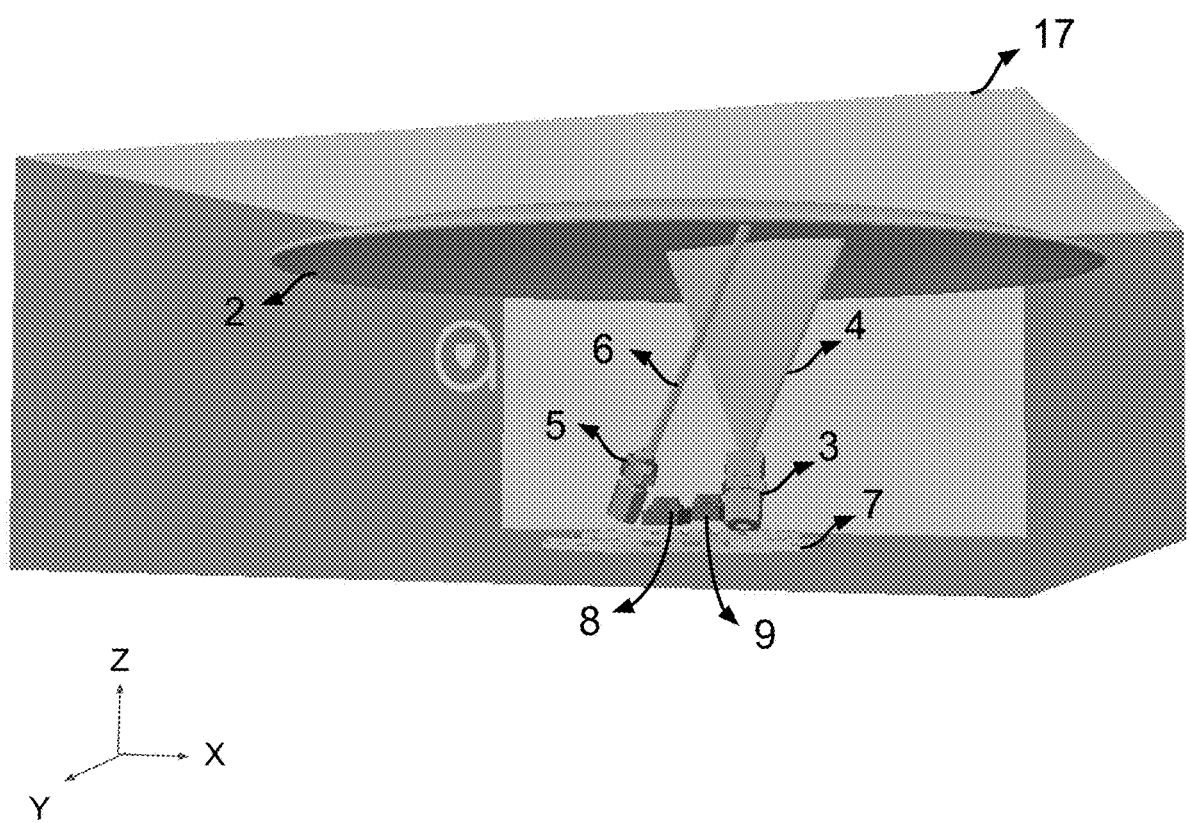
FIG. 8 shows a three-dimensional view of a targeted dish cleaner designed to clean a dish, in accordance with the invention.

FIG. 8 shows a three-dimensional view of a targeted dish cleaner 17 designed to clean a dish, in accordance with the invention. In the targeted dish cleaner 17, dirty regions of dish 2 are targeted for a fast and efficient cleaning of dish 2.

In some embodiments, light source 7 illuminates dish 2, while cameras 8 and 9 capture one or more images of dish 2. A dish is an article that makes contact with a food or a drink while preparing, serving, consuming, or storing of the food or the drink. One or more images from cameras 8 and 9 are inspected by a processor to determine if dish 2 is clean. The processor also estimates locations of dirty regions on dish 2. In some embodiments, locations of dirty regions are estimated using at least two images representing at least two different views of the dish. For example, by measuring the disparities of objects that are visible in multiple views and converting the disparity measurements to depth using stereo or multiple aperture calibration procedures. In other embodiments, locations of dirty regions are estimated using at least one image and a three dimensional model of the dish.

A first nozzle 3 sprays a fluid on dish 2 with a predetermined spray distribution 4. Fluids include liquids and gases such as water, soap, rinsing agent, sanitizing agent, cleaning agent, or air. The first nozzle 3 can reorient or relocate to spray fluid on any region of dish 2 visible in the one or more images captured by cameras 8 and 9. A second nozzle 5 sprays a fluid on dish 2 with a spray distribution 6 having a smaller coverage than that of the first nozzle 3. Coverage refers to the cross sectional area of the spray distribution on the surface of a dish. The second nozzle 5 is relocated or reoriented such that the fluid sprayed by it reaches the locations of dirty regions on dish 2, previously estimated by the processor.

In some embodiments, dish 2 is oriented to avoid holding of fluid. For example, in some embodiments, dish 2 is oriented such that the fluid sprayed by the nozzles leaves the surface of dish 2 due to gravity. In other embodiments, dish 2 is oriented to promote holding of fluid. For example, in some embodiments, dish 2 is oriented such that the fluid sprayed by the nozzles stays on the surface of dish 2 due to gravity or surface tension.

In some embodiments, a single camera is used. In other embodiments, more than one camera is used. Using multiple cameras helps with tolerating objects such as nozzles that might be occluding dish 2. For example, a region of dish 2 may not be visible in one camera view but might be visible in another camera view.

In some embodiments, the fluid sprayed by the nozzles is at a temperature hotter than the temperature of the dish. In other embodiments, the fluid sprayed by the nozzles is at a temperature colder than the temperature of the dish. In other embodiments, the fluid sprayed by the nozzles is at the temperature as the temperature of dish 2.

In some embodiments, the second nozzle 5 sprays fluid at a higher velocity than the first nozzle 3. In some embodiments, the second nozzle 5 sprays fluid at a velocity similar to that of first nozzle 3. In some embodiments, the second nozzle 5 sprays fluid at a lower velocity than the first nozzle 3.

In some embodiments, the first nozzle 3 sprays fluid with a flat spray, conical, hollow cone, or a solid stream spray distribution. In some embodiments, the second nozzle 5 sprays fluid with a solid stream distribution or a flat spray distribution.

A nozzle has three axes of rotation, namely yaw, pitch, and roll. The roll axis typically corresponds to the axis lining up with the longest dimension of a nozzle, which is typically along a line connecting the entry and exit openings (orifices/ports) of a nozzle. The pitch and yaw axis are orthogonal to each other and are orthogonal to the roll axes.

In some embodiments, a nozzle having a flat spray distribution sprays fluid with spray angles having a continuous range from 0 degrees to an angle that is substantially greater than 0 degrees about the yaw axis; and a spray angle substantially equal to 0 degrees about the pitch axis. In other embodiments, a nozzle having a flat spray distribution sprays fluid with spray angles having a continuous range from 0 degrees to an angle that is substantially greater than 0 degrees about the pitch axis; and a spray angle substantially equal to 0 degrees about the yaw axis. In some embodiments, a nozzle having a solid stream spray distribution sprays fluid with a spray angle substantially equal to 0 degrees about both yaw and pitch axes. In some embodiments, a nozzle having a conical spray distribution sprays fluid with a spray angle having a continuous range from 0 degrees to a spray angle that is substantially greater than 0 degrees about both yaw and pitch axes. In some embodiments, a nozzle having a hollow cone spray distribution sprays fluid with spray angles having a continuous range from a first spray angle, which is substantially greater than 0 degrees, to a second spray angle, which is substantially greater than the first spray angle, about both yaw and pitch axes.

In some embodiments, first nozzle 3 and second nozzle 5 are part of a single adjustable nozzle, wherein the adjustable nozzle can be configured to change the shape of its spray distribution. Similarly, in embodiments designed for simultaneous cleaning of two sides of dish 2, first nozzle 3 and second nozzle 5 are part of a single adjustable nozzle, wherein the adjustable nozzle can be configured to change the shape of its spray distribution. For example, the shape of the spray distribution can be adjusted by mechanically altering the shape of the orifice through which fluid emerges from the nozzle.

In some embodiments, a nozzle is reoriented by attaching it to a mount that can rotate about the yaw, pitch, and roll axes. In other embodiments, a nozzle is reoriented by attaching it to a mount that can rotate about the yaw and pitch axes. In other embodiments, a nozzle is reoriented by attaching it to a mount that can rotate about the yaw axis. In other embodiments, a nozzle is reoriented by attaching it to a mount that can rotate about the pitch axis. In other embodiments, a nozzle is reoriented by attaching it to a mount that can rotate about the roll axis.

In some embodiments, a nozzle is relocated by attaching it to a mount that can translate about X, Y, and Z axes of the cartesian coordinate system. In other embodiments, a nozzle is relocated by attaching it to a mount that can translate about the X and Y axes. In other embodiments, a nozzle is relocated by attaching it to a mount that can translate about the X axis. In other embodiments, a nozzle is relocated by attaching it to a mount that can translate about the Y axis. In other embodiments, a nozzle is relocated by attaching it to a mount that can translate about the Z axis.

In some embodiments, light source 7 is arranged in a ring configuration surrounding cameras 8 and 9 to avoid specular reflection from being visible in the images captured by the cameras. Specular reflection refers to a bright image or a glare of light source visible in a camera image due to a reflection of light source by the surface of dish 2.

In some embodiments, first nozzle 3 and second nozzle 5 can rotate about their yaw, pitch, or roll axes. In other embodiments, first nozzle 3 and second nozzle 5 can rotate about their yaw and pitch axes. In other embodiments, first nozzle 3 can rotate about its yaw axis. In other embodiments, first nozzle 3 can rotate about its pitch axis. In other embodiments, first nozzle 10 and second nozzle 12 can rotate about their yaw and pitch axes. In other embodiments, first nozzle 10 can rotate about its yaw axis. In other embodiments, first nozzle 10 can rotate about its pitch axis.

In some embodiments, the targeted dish cleaner 17 comprises a heating element for drying dish 2. Drying could be used to remove fluid from the surface of dish 2. For example, the heating element may generate heat by passing electricity flow through a high resistance coil. In some embodiments, the heating element is in contact with dish 2. Placing a heating element in contact with dish 2 could reduce the time required for dish 2 to dry. In some embodiments, the targeted dish cleaner 17 comprises an enclosure surrounding dish 2, wherein the enclosure is made from a material having higher thermal conductivity than that of dish 2. When the temperature of the enclosure is cooler than that of the dish, fluid from the surface of dish 2 could condense on the surface of the enclosure, thereby facilitating drying of dish 2.

In some embodiments, the targeted dish cleaner 17 comprises a directional flow control valve connected to a plurality of fluids to allow the first nozzle 3 or the second nozzle 5 to spray different types of fluids. Accordingly, a nozzle could spray one type of fluid at one time and another type of fluid at another time. In some embodiments, a mixture of two or more fluids may also be sprayed by a nozzle. In some embodiments, the targeted dish cleaner 17 comprises a flow control valve to adjust the pressure or flow of fluid entering into the first nozzle 3 or the second nozzle 5.

In some embodiments, light source 7 emits ultraviolet light to disinfect the dish. Ultraviolet light could include ultraviolet C radiation for sterilizing a dish.

Figure 9:
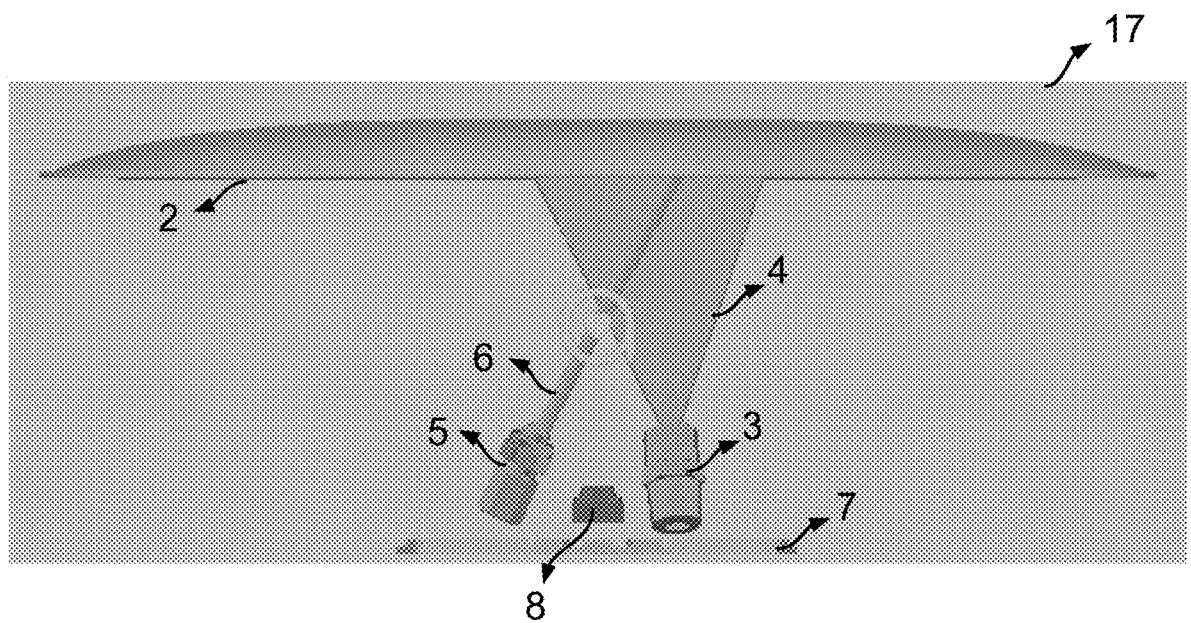
FIG. 9. shows a front view of a targeted dish cleaner designed to clean a dish, in accordance with the invention.

FIG. 9. shows a front view of a targeted dish cleaner 17 designed to clean a dish, in accordance with the invention.

Figure 10:
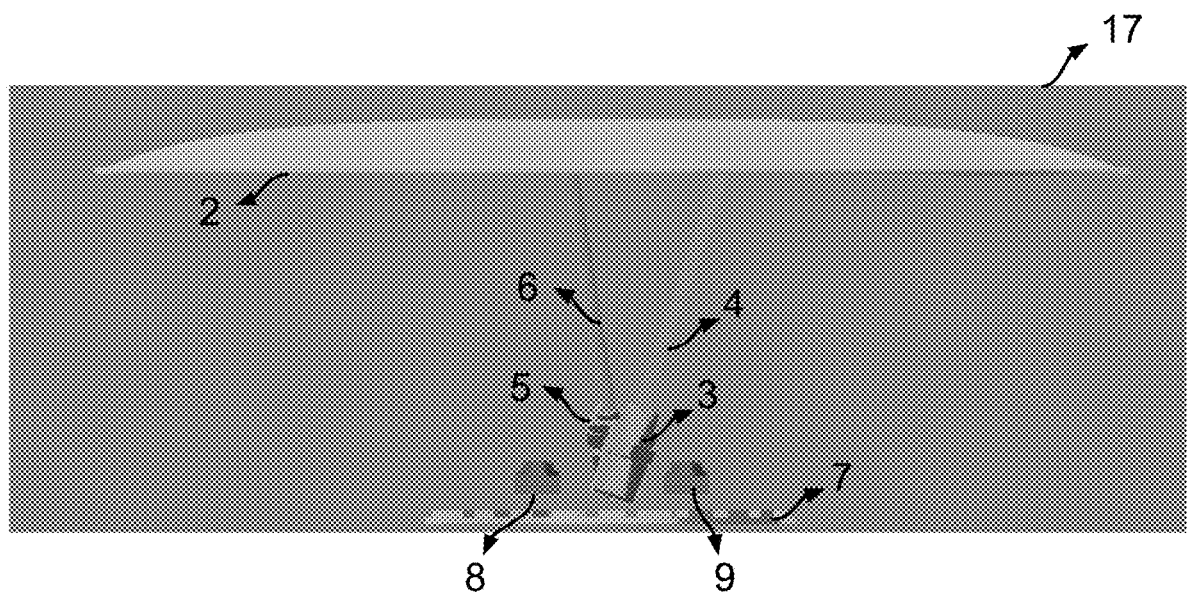
FIG. 10. shows a right-side view of a targeted dish cleaner designed to clean a dish, in accordance with the invention.

FIG. 10. shows a right-side view of a targeted dish cleaner 17 designed to clean a dish, in accordance with the invention.

Figure 11:
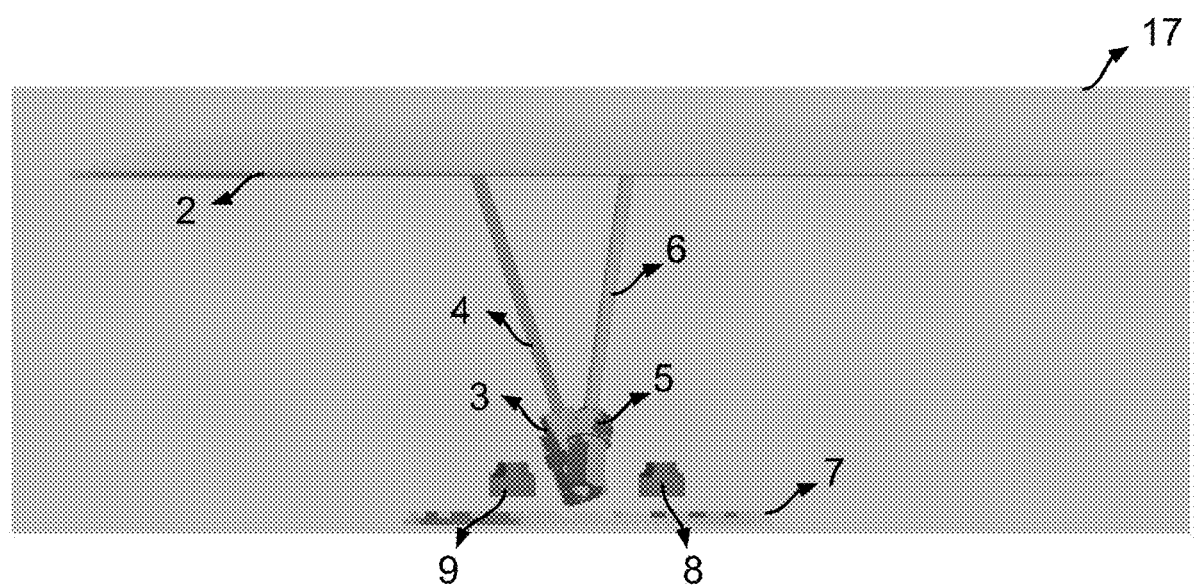
FIG. 11. shows a left-side view of a targeted dish cleaner designed to clean a dish, in accordance with the invention.

FIG. 11. shows a left-side view of a targeted dish cleaner 17 designed to clean a dish, in accordance with the invention.

Figure 12:
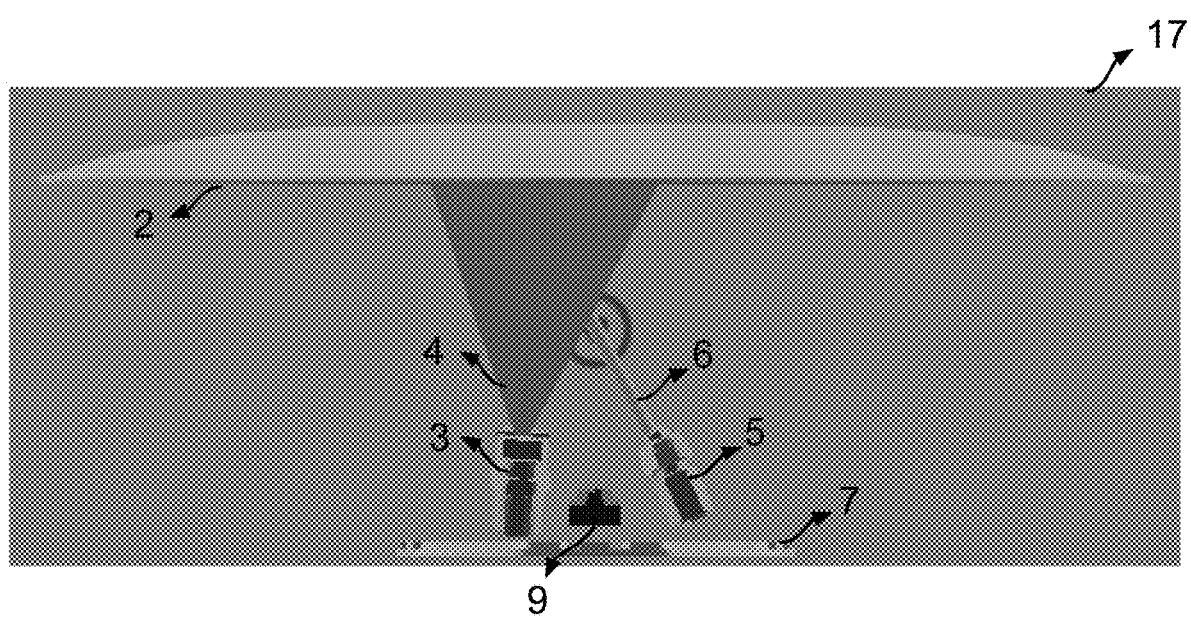
FIG. 12. shows a back view of a targeted dish cleaner designed to clean a dish, in accordance with the invention.

FIG. 12. shows a back view of a targeted dish cleaner 17 designed to clean a dish, in accordance with the invention.

Figure 13:
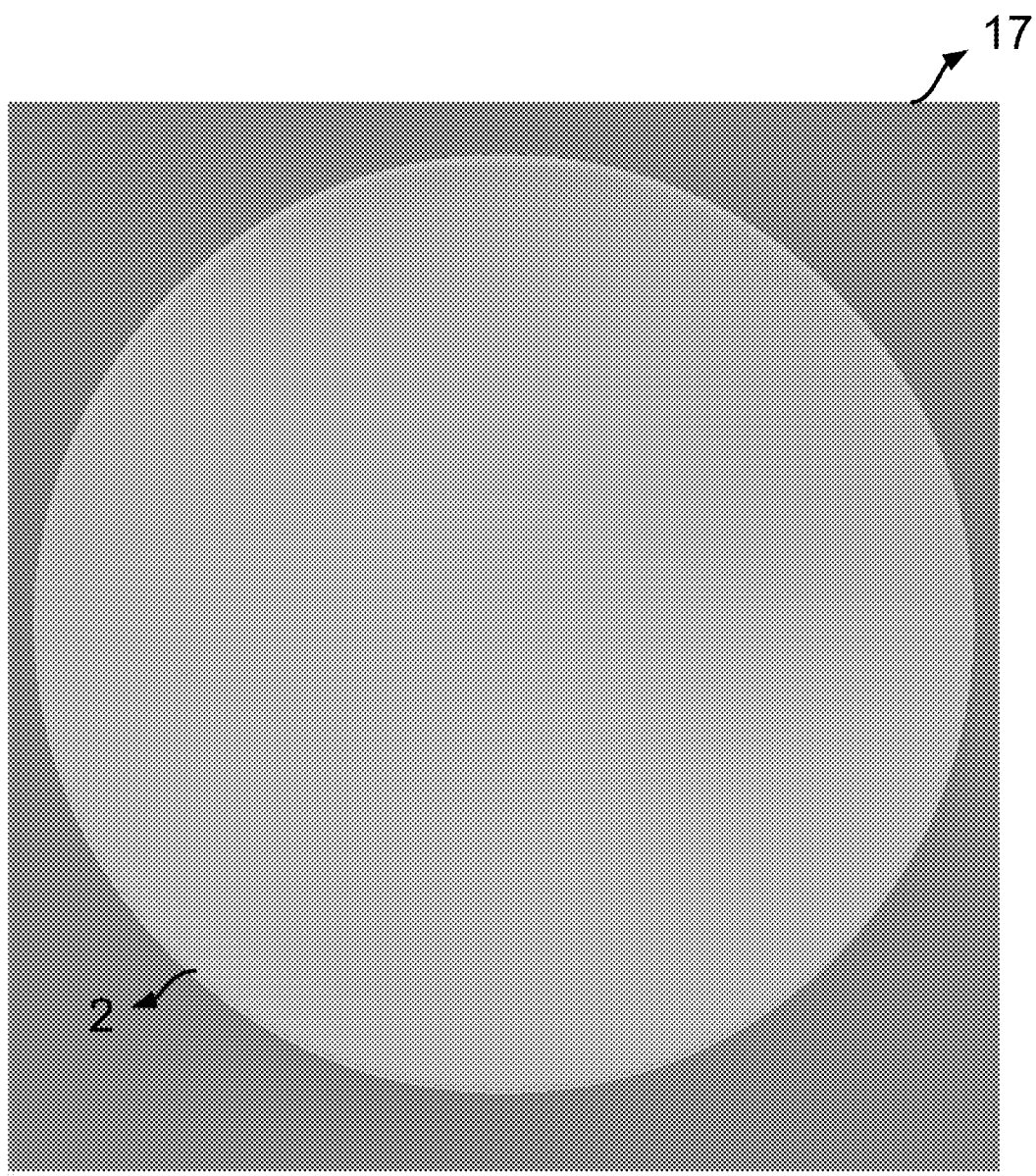
FIG. 13. shows a top view of a targeted dish cleaner designed to clean a dish, in accordance with the invention.

FIG. 13. shows a top view of a targeted dish cleaner 17 designed to clean a dish, in accordance with the invention.

Figure 14:
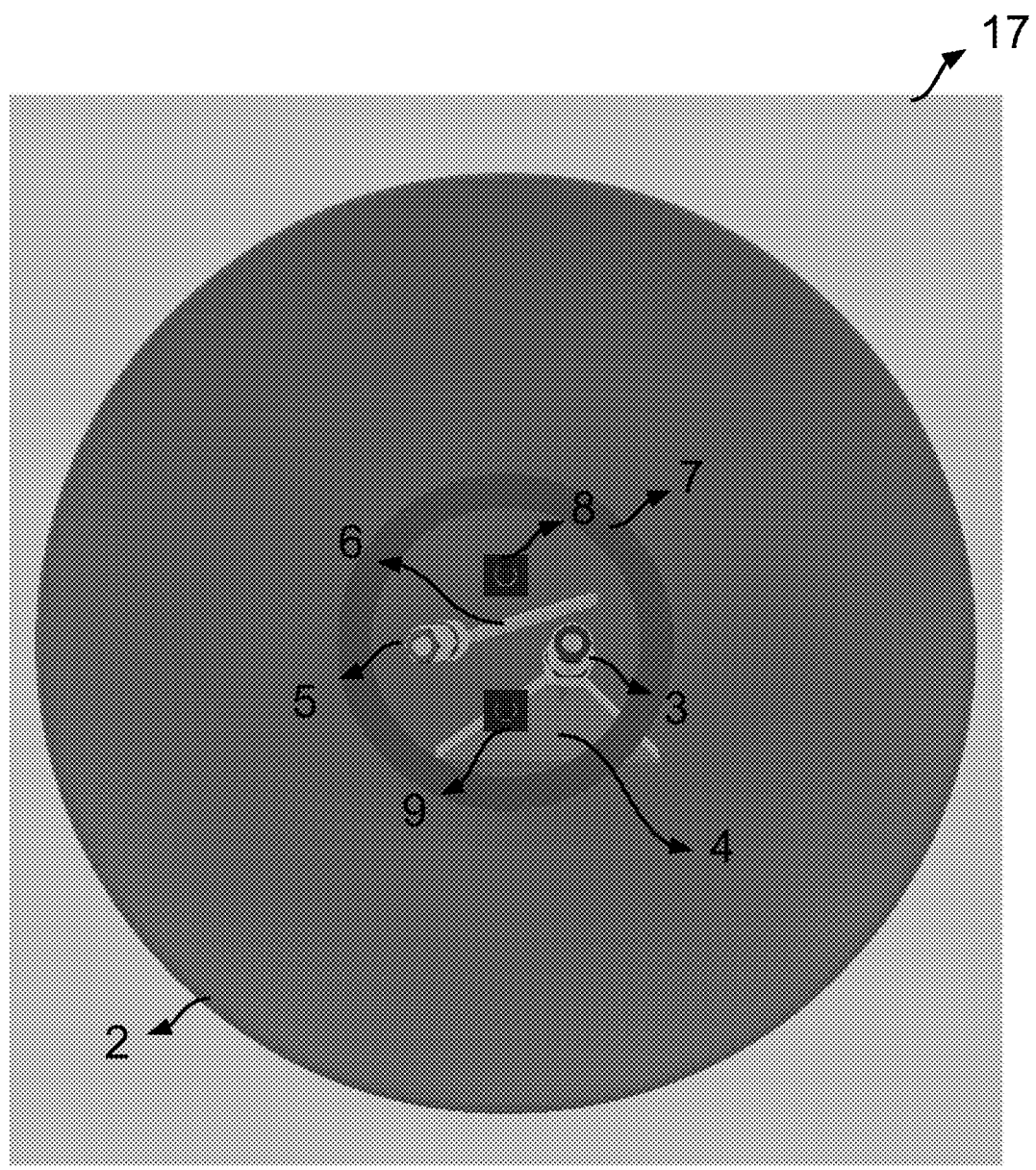
FIG. 14. shows a bottom view of a targeted dish cleaner designed to clean a dish, in accordance with the invention.

FIG. 14. shows a bottom view of a targeted dish cleaner 17 designed to clean a dish, in accordance with the invention.

Figure 15:
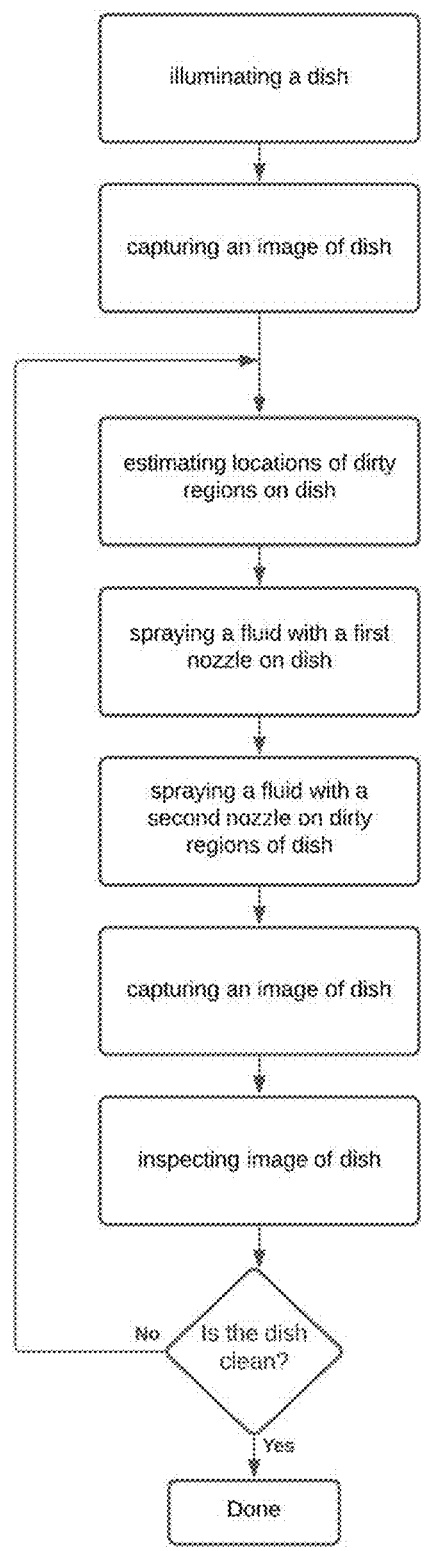
FIG. 15 shows a method for targeted cleaning of a dish, in accordance with the invention.

FIG. 15 shows a method for targeted cleaning of a dish, in accordance with the invention. In some embodiments, the method comprises a sequence of steps. The first step involves illuminating a dish with a light source. The second step involves capturing an image of the dish with a camera. The third step involves estimating locations of dirty regions on the dish. The fourth step involves spraying a fluid with a first nozzle on the dish with a predetermined spray distribution. In some embodiments, the first nozzle can reorient or relocate to spray the fluid on any region of the dish visible in the image. The fifth step involves spraying a fluid with a second nozzle on the dish with a spray distribution having a smaller coverage than that of the first nozzle. Coverage refers to the cross sectional area of the spray distribution on the surface of a dish. In some embodiments, the second nozzle is relocated or reoriented such that the fluid reaches the locations of dirty regions on the dish. Accordingly, dirty regions of the dish are targeted for a fast and efficient cleaning of the dish.

In some embodiments, multiple sides of a dish are cleaned simultaneously using the above method. In some embodiments, the method further includes drying the dish after spraying fluid with the second nozzle.

In some embodiments, an image of the dish is captured after spraying fluid with the second nozzle. The captured image is inspected to check if the dish is clean. In some embodiments, the cleanliness of a dish is ascertained by looking for image pixel values that are substantially different from the pixel values corresponding to clean regions of the dish. If the number of such anomalous pixels are above a threshold, then the dish is classified to be unclean. In such a scenario where a dish is classified as being unclean, the cleaning process restarts from the third step of estimating locations of dirty regions on the dish. This is followed by the fourth step of spraying a fluid with a first nozzle and the fifth step of spraying a fluid with a second nozzle. An image of the dish is captured and inspected again. In some embodiments, a dish is cleaned with steps 4 and 5 multiple times until the dish is found clean during inspection.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described above, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as a random access memory (RAM), a read only memory (ROM), a storage device such as a solid state drive (SSD) or a hard drive. Any such computer readable medium may reside on or within a single computational apparatus, and may be present on or within different computational apparatuses within a system or network.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A system for cleaning a dish, comprising:
   a. a light source for illuminating said dish;
   b. a camera for capturing an image of said dish;
   c. a processor configured to estimate locations of dirty regions on said dish from said image, in order to specifically target said locations of dirty regions on said dish relative to other locations on said dish;
   d. a first nozzle for spraying a fluid on said dish with a predetermined spray distribution, wherein said first nozzle sprays said fluid on any region of said dish visible in said image; and
   e. a second nozzle for spraying a fluid on said locations of dirty regions on said dish with a spray distribution having a smaller coverage than that of said first nozzle, wherein said second nozzle is relocated or reoriented to a specific location or orientation such that the fluid specifically targets said locations of dirty regions on said dish relative to other locations on said dish, whereby dirty regions of said dish are targeted for a fast and efficient cleaning of said dish.

2. The system of claim 1, wherein said dish is an article that makes contact with a food or a drink while preparing, serving, consuming, or storing of the food or the drink.

3. The system of claim 1, wherein said fluid is water, soap, rinsing agent, sanitizing agent, cleaning agent, or air.

4. The system of claim 1, further comprising another set of light source, camera, processor, first nozzle and second nozzle to clean two opposite sides of a dish simultaneously.

5. The system of claim 1, wherein said locations of dirty regions are estimated using at least two images representing at least two different views of said dish or by using at least one image and a three dimensional model of said dish.

6. The system of claim 1, wherein said dish is oriented to avoid holding of said fluid such that said fluid leaves the surface of said dish due to gravity.

7. The system of claim 1, wherein said fluid is at a temperature hotter than the temperature of said dish.

8. The system of claim 1, wherein said second nozzle sprays fluid at a higher velocity than said first nozzle.

9. The system of claim 1, wherein said first nozzle and second nozzle sprays fluid with a flat spray, conical, hollow cone, or a solid stream spray distribution.

10. The system of claim 1, wherein said first nozzle and second nozzle are part of a single adjustable nozzle, wherein said adjustable nozzle can be configured to change the shape of its spray distribution.

11. The system of claim 1, wherein said light source is arranged in a ring configuration surrounding said camera to avoid specular reflection from being visible in said image.

12. The system of claim 1, wherein said first nozzle and second nozzle can rotate about their yaw, pitch, or roll axes.

13. The system of claim 1, further comprising a heating element for drying said dish.

14. The system of claim 13, wherein said heating element is in contact with said dish.

15. The system of claim 1, further comprising an enclosure surrounding said dish, wherein the enclosure is made from a material having higher thermal conductivity than that of said dish.

16. The system of claim 1, further comprising a directional flow control valve connected to a plurality of fluids to allow said first nozzle or said second nozzle to spray different types of fluids.

17. The system of claim 1, further comprising a flow control valve to adjust the pressure or flow of fluid entering into said first nozzle or said second nozzle.

18. The system of claim 1, wherein said light source emits ultraviolet light to disinfect said dish.

19. The system of claim 1, wherein said first nozzle is located at a predetermined location and is oriented at a predetermined orientation.

20. The system of claim 1, wherein said second nozzle is located at a predetermined location and is oriented at a predetermined orientation.

* * * * *